United States Patent
Varadhan et al.

(10) Patent No.: US 9,191,366 B2
(45) Date of Patent: *Nov. 17, 2015

(54) SCALABLE SECURITY SERVICES FOR MULTICAST IN A ROUTER HAVING INTEGRATED ZONE-BASED FIREWALL

(71) Applicant: Juniper Networks, Inc., Sunnyvale, CA (US)

(72) Inventors: Kannan Varadhan, San Jose, CA (US); Jean-Marc Frailong, Los Altos Hills, CA (US); Anjan Venkatramani, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/262,593

(22) Filed: Apr. 25, 2014

(65) Prior Publication Data
US 2014/0237541 A1    Aug. 21, 2014

Related U.S. Application Data

(63) Continuation of application No. 12/432,366, filed on Apr. 29, 2009, now Pat. No. 8,713,627.

(60) Provisional application No. 61/088,907, filed on Aug. 14, 2008.

(51) Int. Cl.
*H04L 29/06* (2006.01)
*H04L 12/725* (2013.01)
(Continued)

(52) U.S. Cl.
CPC ............ *H04L 63/0227* (2013.01); *H04L 12/18* (2013.01); *H04L 45/00* (2013.01); *H04L 45/16* (2013.01); *H04L 45/30* (2013.01); *H04L 63/0254* (2013.01); *H04L 63/104* (2013.01)

(58) Field of Classification Search
CPC ............ H04L 63/0227; H04L 63/0254; H04L 63/104; H04L 12/18; H04L 45/30
See application file for complete search history.

(56) References Cited

U.S. PATENT DOCUMENTS 6,321,334 B1    11/2001    Jerger et al.
7,184,437 B1    2/2007    Cole et al.
(Continued)

OTHER PUBLICATIONS

Notice of Allowance from U.S. Appl. No. 13/669,303, dated Dec. 5, 2014, 11 pp.
(Continued)

*Primary Examiner* — Robert Leung
(74) *Attorney, Agent, or Firm* — Shumaker & Sieffert, P.A.

(57) ABSTRACT

A multicast-capable firewall allows firewall security policies to be applied to multicast traffic. The multicast-capable firewall may be integrated within a routing device, thus allowing a single device to provide both routing functionality, including multicast support, as well as firewall services. The routing device provides a user interface by which a user specifies one or more zones to be recognized by the integrated firewall when applying stateful firewall services to multicast packets. The user interface supports a syntax that allows the user to define subsets of the plurality of interfaces associated with the zones, and define a single multicast policy to be applied to multicast sessions associated with a multicast group. The multicast policy identifies common services to be applied pre-replication, and exceptions specifying additional services to be applied post-replication to copies of the multicast packets for the one or more zones.

20 Claims, 7 Drawing Sheets

(51) Int. Cl.
*H04L 12/18* (2006.01)
*H04L 12/701* (2013.01)
*H04L 12/761* (2013.01)

(56) References Cited

U.S. PATENT DOCUMENTS

| | | | |
|---|---|---|---|
| 7,263,099 B1 * | 8/2007 | Woo et al. | 370/390 |
| 7,310,306 B1 * | 12/2007 | Cheriton | 370/218 |
| 7,860,999 B1 | 12/2010 | Subramanian et al. | |
| 8,050,559 B2 | 11/2011 | Sindhu | |
| 8,300,532 B1 | 10/2012 | Venkatramani et al. | |
| 8,307,422 B2 | 11/2012 | Varadhan et al. | |
| 8,316,435 B1 | 11/2012 | Varadhan et al. | |
| 8,339,959 B1 | 12/2012 | Moisand et al. | |
| 8,428,458 B2 | 4/2013 | Sindhu | |
| 8,713,627 B2 | 4/2014 | Varadhan et al. | |
| 2002/0080720 A1 | 6/2002 | Pegrum et al. | |
| 2003/0065944 A1 | 4/2003 | Mao et al. | |
| 2004/0044761 A1 | 3/2004 | Phillipi et al. | |
| 2004/0174879 A1 | 9/2004 | Basso et al. | |
| 2005/0080901 A1 | 4/2005 | Reader | |
| 2005/0114656 A1 | 5/2005 | Liu et al. | |
| 2005/0138369 A1 | 6/2005 | Lebovitz et al. | |
| 2005/0198299 A1 | 9/2005 | Beck et al. | |
| 2006/0056297 A1 | 3/2006 | Bryson et al. | |
| 2007/0022479 A1 | 1/2007 | Sikdar et al. | |
| 2007/0110062 A1 | 5/2007 | Balay et al. | |
| 2007/0133530 A1 | 6/2007 | Previdi et al. | |
| 2007/0209058 A1 | 9/2007 | Anantharamiah et al. | |
| 2008/0134286 A1 | 6/2008 | Amdur et al. | |
| 2009/0172170 A1 | 7/2009 | Rey | |
| 2009/0182843 A1 | 7/2009 | Hluchyj et al. | |
| 2013/0074177 A1 | 3/2013 | Varadhan et al. | |

OTHER PUBLICATIONS

Amendment in Response to Office Action dated Jul. 1, 2014, from U.S. Appl. No. 13/669,303, filed Oct. 1, 2014, 16 pp.
"Concepts and Examples ScreenOS Reference Guide," Juniper Networks, Inc., vol. 10, Release 5.4.0, Rev B, PIN 530-015777-01, 2006, 84 pages.
"Engress and Ingress Filtering," CPNI, Centre for the Protection of National Infrastructure, Apr. 20, 2006, Retrieved on May 16, 2012, Online: http://www .cpni.gov.uk/Docu ments/Publications/2006/ 2006004-TNO106_Egress_ingress.pdf, 10 pp.
"FortiOS Carrier CLI Reference Version 3.0 MR4," Fortinet, Inc., Mar. 11, 2008, p. 15-16, 102.
"Getting to Know Security Manager," Chapter 1, User Guide for Cisco Security Manager 3.0.2, Cisco Systems, Inc., 2007, 14 pp.
"Managing FlexConfigs," Chapter 16, User Guide for Cisco Security Manager 3.0.2, Cisco Systems, 2007, pp. 16-1 to 16-46.
"Method and System of MPLS based Firewall/Access Control," IP.com Journal, Technical Disclosure, IBM, May 30, 2008, 3 pp.
"NetScreen New Features Guide," Netscreen Technologies, Inc., ScreenOS 4.0.1, Rev.B, P/N 093-0754-000, 2003, 108 pp.
"Zone-Based Policy Firewall," CISCO, Cisco Systems, Inc., Jun. 2006, 46 pp.
Bachert, "IPv4 Multicast Security: A Network Perspective," SANS Institute InfoSec Reading Room, 2002, 15 pp.
Cameron et al., "Configuring Juniper Networks SetScreen &SSG Firewalls," REFEREX, Feb. 2007, 90 pp.
Fang et al., "Security Framework for Provider-Provisional Virtual Private Networks (PPVPNs)," Network Working Group, rfc4111.txt, IETF Standard, Internet Engineering Task Force, Jul. 2005, 46 pp.
Wheeler, "Virtualization Technologies Overview, Juniper Networks NetScreen Integrated Firewall and VPN Security Devices," Juniper Networks, Inc., Mar. 2005, 10 pp.
Prosecution History from U.S. Pat. No. 8,713,627, dated Dec. 21, 2011 through Dec. 19, 2013, 148 pp.
Prosecution History from U.S. Pat. No. 8,307,422, dated Dec. 19, 2011 through Aug. 8, 2012, 54 pp.
Prosecution History from U.S. Appl. No. 13/669,303, dated Jul. 1, 2014 through Jul. 1, 2014, 19 pp.
Prosecution History from U.S. Pat. No. 8,316,435, dated Aug. 16, 2011, through Oct. 31, 2012, 102 pp.
Extended European Search Report for counterpart European Application No. E.P09162220.9, dated Nov. 30, 2009, 11 pp.
Notification of First Office Action from counterpart Chinese Application No. 200910160048.8, dated Jun. 30, 2011, 7 pp.

* cited by examiner

| MULTICAST SESSION TABLE 88 | | | | | |
|---|---|---|---|---|---|
| INPUT INTERFACE | SOURCE | GROUP ID | OIF_IDs, COMMON SERVICES | OIF_ID, ADDED SERVICES, DELETED SERVICES | ••• |
| {90} | | | | | |

FIG. 4

SCALABLE SECURITY SERVICES FOR MULTICAST IN A ROUTER HAVING INTEGRATED ZONE-BASED FIREWALL

This application is a continuation of U.S. application Ser. No. 12/432,366, filed Apr. 29, 2009, which claims the benefit of U.S. Provisional Application No. 61/088,907, filed Aug. 14, 2008, the entire contents of each of which being incorporated herein by reference.

TECHNICAL FIELD

The invention relates to computer networks and, more particularly, to transmission of multicast traffic within a computer network.

BACKGROUND

A computer network is a collection of interconnected computing devices that exchange data and share resources. There are a number of approaches for communicating the data between the computing devices within the network. One approach, known as "multicasting," makes use of multicast trees in which a source device sends a single data packet for distribution to a group of one or more recipient computing devices. With multicasting, the source device assigns a multicast identifier to the data, enabling each computing device of the group to receive a copy of the data. In some cases, the source device sends multicast packets over the network to a router configured for multicasting. In turn, the router replicates the packets and forwards copies of the packets to other multicast-enabled routers. The other routers, in turn, replicate the packets and repeat the forwarding process so that each of the recipient devices receives copies of the packets. In this manner, multicast packets are delivered through one or more networks using a multicast tree.

Consumers may switch between different multicast content provided by a content provider or multiple content providers by submitting "multicast action requests." In particular, the multicast action requests allow consumers to join and leave the various multicast groups associated with the multicast identifiers. An exemplary protocol for issuing multicast action requests, such as a join request, is the Internet Group Management Protocol (IGMP). To join a particular multicast group, receiving devices send multicast join requests to upstream (i.e., intermediate) routers, which in turn forward the join request to the source device.

Due to increasing reliance on network-accessible computers, network security has become a major issue for organizations and individuals. To help ensure the security of their computers, organizations and individuals frequently install security devices between public networks and their private networks. A goal of such security devices is to prevent unwanted or malicious information from the public network from affecting devices in the private network.

These security devices are commonly referred to as firewall device. Typically, the firewall is a dedicated device that is configured to permit or deny traffic flows based on an organization's security policies. Typical high-end firewalls provide packet forwarding by dynamically load-balancing packet flows to a set of service cards. These service cards provide flow-based security services, such as flow blocking, network address translation (NAT), anti-virus (AV) scanning and detection, intrusion detection protection (IDP) and/or any other security services. The firewall device typically intercepts packets entering and leaving the private network, and processes the packets with the service cards to determine whether to permit or deny the packet based on information included within each packet that may define a state of a flow associated with the packet.

Conventional firewalls, however, have difficulty applying security services to multicast traffic for various reasons. For example, some firewalls may apply services before replication of the multicast traffic, which leads to very uniform treatment of all of the multicast traffic and a lack of richness. Other firewalls may apply services after replication of the multicast traffic, leading to unscalable multicast, particularly for high-volume replications that may be required in a high-end firewall environment. Moreover, the expressivity of current systems tends to focus on breaking the multicast down into n-way unicast flows to which security services are individually applied, leading to a waste in resources within the firewall.

SUMMARY

In general, the invention is directed to techniques for providing scalable firewall services for multicast flows. The techniques may improve scalability of application of security services to multicast transmissions in a firewall network device. Moreover, the firewall may be integrated within a routing device, thus allowing a single device to provide both routing functionality, including multicast support, as well as firewall services. As one example, a service provider may deploy a single device as described herein to provide multicast services to customers as well as apply firewall policies to the customer's multicast traffic. The integrated firewall may be a zone-based firewall that provides zone-based firewall services that allow zone-based security policies to be defined and applied for the different network interfaces of the router, thus allowing the zone-based firewall to provide scalable secure connectivity between networks of differing trust levels.

According to the techniques of the invention, the zone-based firewall provides a user interface having a command syntax that allows a user to define the application of both pre- and post-replication services to multicast packets. The techniques may leverage forwarding plane infrastructure of an integrated services network device for efficient replication of multicast packets. Further, the techniques described herein may allow expressivity and scaling to be incorporated into multiple planes of the integrated services network device, such as the management plane, control plane, service plane, and data plane.

For example, the management plane of the integrated services network device supports a command syntax that allows a network administrator to define multicast policies that reflect multicast behavior. The syntax provides a single container for each multicast policy, and uses an intuitive and user-friendly expressivity. The syntax allows the user to categorize the types of services to be applied with respect to different zones defined on the zone-based firewall, which leads to scalable service treatment.

In accordance with the techniques described herein, the control plane of the integrated services network device is responsible for creating "service aware" outgoing interfaces (OIFs), that is, OIFs that replicate and forward the multicast packets in a manner that is consistent with and conducive to efficiently applying firewall services to the multicast packets. To do this, a routing protocol daemon (RPD) and a services daemon (SD) within a control plane of the router cooperate to ensure that the routing protocol daemon creates a set of multicast replication trees for each multicast group. During the cooperation between the RPD and the SD, the RPD presents an outgoing interface (OIF) list to the SD based on multicast information maintained by the RPD as the RPD receives multicast join and leave requests. The SD may prune the OIF list based on firewall policies, and also determines a set of post-replication services to be applied to multicast packets for the OIF list. The SD determines the set of post-replication services with reference to a multicast session table that reflect the multicast policies entered by an administrator. Each post-replication service yields a sub-tree to which that service is applied uniformly for all OIFs in that sub-tree. This evaluation by the SD may be done at the time that the RPD initiates multicast tree creation, e.g., upon receipt of the first multicast content packet for a multicast group. The SD may also re-evaluate this breakdown at the time of subsequent join or leave messages for the multicast group.

The services plane of the zone-based firewall performs pre-replication services upon the multicast packets. For each post-replication service treatment group, the services plane applies each service in that treatment group to copies of the multicast packets. The services plane identifies a sub-tree for that treatment group, and sends the treated multicast packets to the forwarding plane for replication for that sub-tree.

The techniques of the invention automatically leverage any efficient replication techniques currently in place within the data plane of the zone-based firewall. On return from the services plane, the data plane uses existing replication techniques to efficiently replicate each serviced packet to the sub-tree for the serviced packet, according to a multicast forwarding information base (FIB).

In one embodiment, a network router comprises a plurality of interfaces configured to send and receive multicast packets, a firewall integrated within the network router, the firewall configured to apply stateful firewall services to the multicast packets, and a routing engine comprising a control unit that executes a routing protocol to maintain routing information specifying routes through a network, wherein the control unit executes at least one multicast protocol to establish a multicast group for communicating the multicast packets from a multicast source to a plurality of multicast receivers. The network router also includes a forwarding engine configured by the routing engine to select next hops for the multicast packets in accordance with the routing information, the forwarding engine comprising a switch fabric to forward the multicast packets to the interfaces based on the selected next hops, wherein the forwarding engine includes a flow control module that, upon receiving multicast packets from the network, directs one or more of the multicast packets to the firewall for application of the stateful firewall services. The network router also includes a user interface by which a user specifies one or more zones to be recognized by the firewall when applying the stateful firewall services to the multicast packets, wherein the user interface supports a syntax that: (i) allows the user to define subsets of the plurality of interfaces associated with the zones, and (ii) allows the user to define a single multicast policy to be applied to multicast sessions associated with a multicast group, wherein the multicast policy specifies actions to be applied to multicast sessions for the specified zones. The firewall is configured to apply the stateful firewall services to the multicast packets based on the multicast policy and the zones specified by the user.

In another embodiment, a method comprises executing, with a routing engine of a router, at least one multicast protocol to establish a multicast group for communicating multicast packets from a multicast source to a plurality of multicast receivers, and presenting, with the router, a user interface by which a user specifies one or more zones to be recognized by a firewall integrated within the router. The user interface supports a syntax that (i) allows the user to define subsets of the plurality of interfaces associated with the zones, and (ii) allows the user to define a single multicast policy to be applied to multicast sessions associated with a multicast group, wherein the multicast policy specifies actions to be applied to multicast sessions for the specified zones. The method also includes receiving, from a network, multicast packets at a plurality of interfaces of the router, and directing, with a flow control module of a forwarding engine of the router, one or more of the received multicast packets to the firewall for application of stateful firewall services. The method further includes applying stateful firewall services to the multicast packets with the firewall of the network router based on the multicast policy and the zones specified by the user, and after applying stateful firewall services, forwarding at least some of the multicast packets from the firewall to the forwarding engine. The method also includes selecting next hops for the multicast packets within the network with the forwarding engine, and forwarding the multicast packets to the interfaces in accordance with the selected next hops.

In a further embodiment, a computer-readable storage medium comprises program instructions to cause a processor to execute, with a routing engine of a router, at least one multicast protocol to establish a multicast group for communicating multicast packets from a multicast source to a plurality of multicast receivers, and present, with the router, a user interface by which a user specifies one or more zones to be recognized by a firewall integrated within the router. The user interface supports a syntax that (i) allows the user to define subsets of the plurality of interfaces associated with the zones, and (ii) allows the user to define with a single multicast policy to be applied to multicast sessions associated with a multicast group. The multicast policy identifies: (a) one or more common services to be applied to copies of the multicast packets destined for two or more interfaces in one or more of the zones, and (b) one or more exceptions specifying one or more of the zones and additional services to be applied to copies of the multicast packets for the one or more zones.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a block diagram illustrating an example multicast session table in further detail.

DETAILED DESCRIPTION

Figure 1:
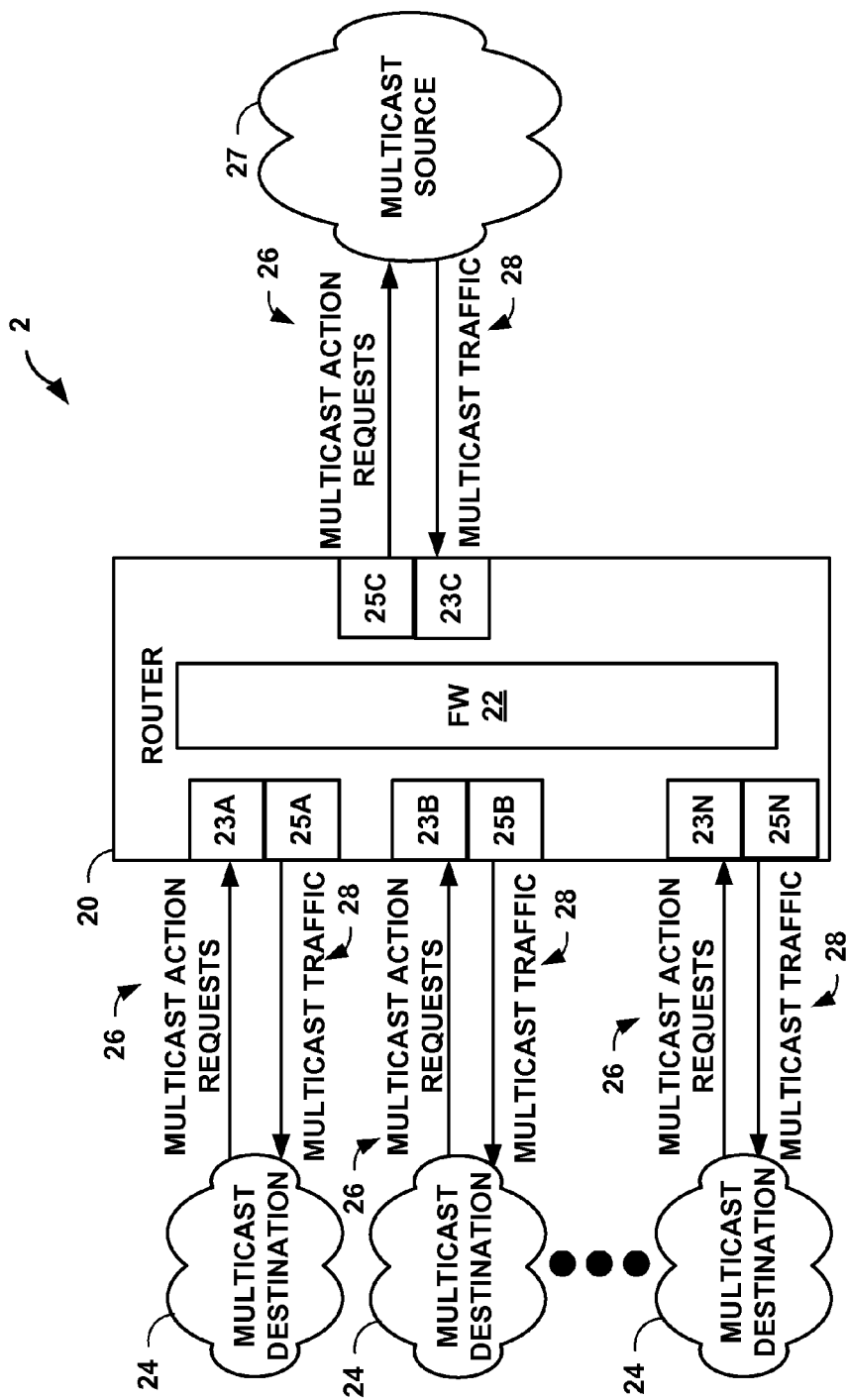
FIG. 1 is a block diagram illustrating an example router having an integrated zone-based firewall that provides scalable services for multicast in accordance with the principles of the invention.

FIG. 1 is a block diagram illustrating an example network environment 2 in which an example multicast-enabled router 20, which may represent any routing device, includes an integrated firewall (FW) 22. In this example, FW 22 provides zone-based firewall services that allow zone-based security policies to be defined and applied for the different network interfaces of the router. In the example of FIG. 1, router 20 includes ingoing interfaces 23A-23N and outgoing interfaces 25A-25N for sending and receiving multicast traffic and multicast action requests to and from customer sites 24 and service provider network 27 via physical network links. Router 20 provides a user interface that allows the service provider to define zones and corresponding security policies with respect to those physical interfaces. In addition, the user interface supports a command syntax that allows configuration of security polices to be applied by FW 22 to multicast traffic communicated between those zones.

In general, router 20 transports multicast communications between multicast source 27 and multicast destinations 24. Although only router 20 is shown in FIG. 1, network environment 2 may be interconnected with internal routers and other network devices via high-speed network links as part of a network, such as a service provider network.

Router 20 includes an integrated firewall (FW) 22 having ingoing interfaces 23A-23N and outgoing interfaces 25A-25N, which may be physical interfaces coupled to a plurality of links associated with different zones that connect the firewall 22 to source 27 and destinations 24. Firewall 22 may provide zone-based firewall services that allow zone-based security policies to be defined and applied for the different network interfaces, sub-interfaces and label switched paths supported the router 20.

In general, firewall 22 intercepts traffic flows being communicated between networks of different trust levels, and may permit or deny those traffic flows based on an organization's security policies and based on information included within each packet of the traffic flows. Router 20 includes ingoing interfaces 23A-23N and outgoing interfaces 25A-25N (i.e., physical or logical interfaces), and an administrator may associate different subsets of the ingoing and outgoing interfaces so as to define different zones. For example, an administrator may define a first zone having interfaces associated with multicast source 27, and may define different zones having interfaces associated with the different multicast destinations 24.

Moreover, as illustrated in FIG. 1, the firewall 22 may be integrated within router 20, thus allowing a single device to provide both routing functionality, including multicast support, as well as firewall services. In this manner, the techniques described herein may allow the service provider to avoid the requirement to deploy separate non-multicast capable firewalls between router 20 and multicast destinations 24.

As described herein, router 20 may provide a user interface having a command syntax that allows a user, such as the network administrator, to configure router 20 to define the input and output interfaces associated with each of the zones. The user may also configure policies on a per-zone basis that identify particular security services to be applied to different zones. For example, network traffic coming from an untrusted zone and destined for a trusted zone may be subject to greater scrutiny than traffic coming from one trusted zone to another zone of the same trusted level. For example, firewall 22 of router 20 may provide flow-based security services, such as flow blocking, network address translation (NAT), anti-virus (AV) scanning and detection, intrusion detection protection (IDP) and/or any other security services.

Router 20 may receive multicast action requests from multicast receivers within multicast destinations 24 to join or leave various multicast groups provided by multicast servers, such as multicast source 27. Group membership may be very dynamic, and multicast receivers may join or leave arbitrarily. The multicast groups may be identified in the join/leave requests by a multicast identifier that specifies a particular source, group pair. router 20 may transmit multicast content, such as Internet Protocol (IP) video services, IP television (IPTV), desktop conferences, corporate broadcasts, or other content, from multicast source 27 to the receivers multicast destinations 24 For example, router 20 may receive, on an input interface associated with a particular zone, multicast content from a multicast source 27. The multicast source 27 may provide the multicast content in the form of multicast data packet streams to one or more multicast groups that receivers for the multicast content have joined. Each multicast data packet includes a multicast identifier that identifies the respective multicast group. router 20 may maintain information associating the receivers with the multicast groups, and transmit copies of the multicast data packets from multicast source 27 to the receivers.

According to the techniques of the invention, router 20 supports a command syntax that allows an administrator or software agent to define a multicast policy that specifies services to be applied to multicast communications received from one zone and destined to a plurality of output zones. In other words, the multicast policy defined using the syntax sets forth a multicast policy to be applied to one-to-N multicast traffic. The syntax may allow the policy to be defined so as to configure firewall 22 to apply some common set of services to a multicast packet before replication of the multicast packet, and also to apply other services as needed on a per-zone basis to copies of the multicast packet after replication of the multicast packet to be sent to multicast receivers associated with different zones.

In some cases, communications received on an input interface associated with a source zone to multiple output interfaces associated with different destination zones may require the same services to be applied. For example, firewall 22 may need to apply a common set of security services to a multicast packet received from an untrusted zone A destined to be replicated to trusted zone B and trusted zone C. Moreover, some extra security services may need to be applied to the replicated packet to be output to trusted zone B that do not need to be applied to the replicated packet destined for trusted zone C. Conventional firewall devices may be limited to applying the services only prior to replication of the packets for the different zones, which might result in unnecessarily applying the extra services to some of the packets. Moreover, other conventional firewall devices are often limited to applying the services only after replication of the packets, which would require first replicating the packet and then applying the services post-replication to multiple packets for each of zones B and C. In contrast, the techniques of the invention may allow unnecessary, repetitive security services to be avoided, thereby reducing the computational resources consumed.

Moreover, the techniques of the invention provide a management interface expressivity, i.e., a syntax, that leverages the common security services to be applied to traffic of a multicast group session and allows for clear delineation between those common services for the multicast group session from the special case services to be applied to only certain output zones for the session. This management interface expressivity may be more useful for system administrators, and may also drive the behavior of router 20 and firewall 22 more efficiently. In this way, the techniques of the invention may allow for much greater scalability in applying services to multicast traffic.

Generally, control plane modules of router 20 cooperate in accordance with the techniques described herein to create multicast replication trees that describe internal multicast replication requirements for router 20 in accordance with defined multicast policies. The control plane installs the multicast trees into the data plane of router 20 so as to control the replication and internal forwarding of the multicast packets within router 20. As described in further detail below, the multicast replication trees are created based on the pre-replication and post-replication services required to be applied, and efficiently define which security services are to be applied pre-replication and post-replication for any given multicast group session.

The techniques of the invention automatically leverage any efficient replication techniques existing within the data plane (e.g., forwarding hardware) of router 20. On return from the services plane, the data plane of router 20 uses existing replication techniques to efficiently replicate each serviced multicast packet for forwarding to the corresponding output interface associated with the respective sub-tree for the serviced packet, according to a multicast forwarding information base (FIB) installed within that forwarding plane of router 20.

Figure 2:
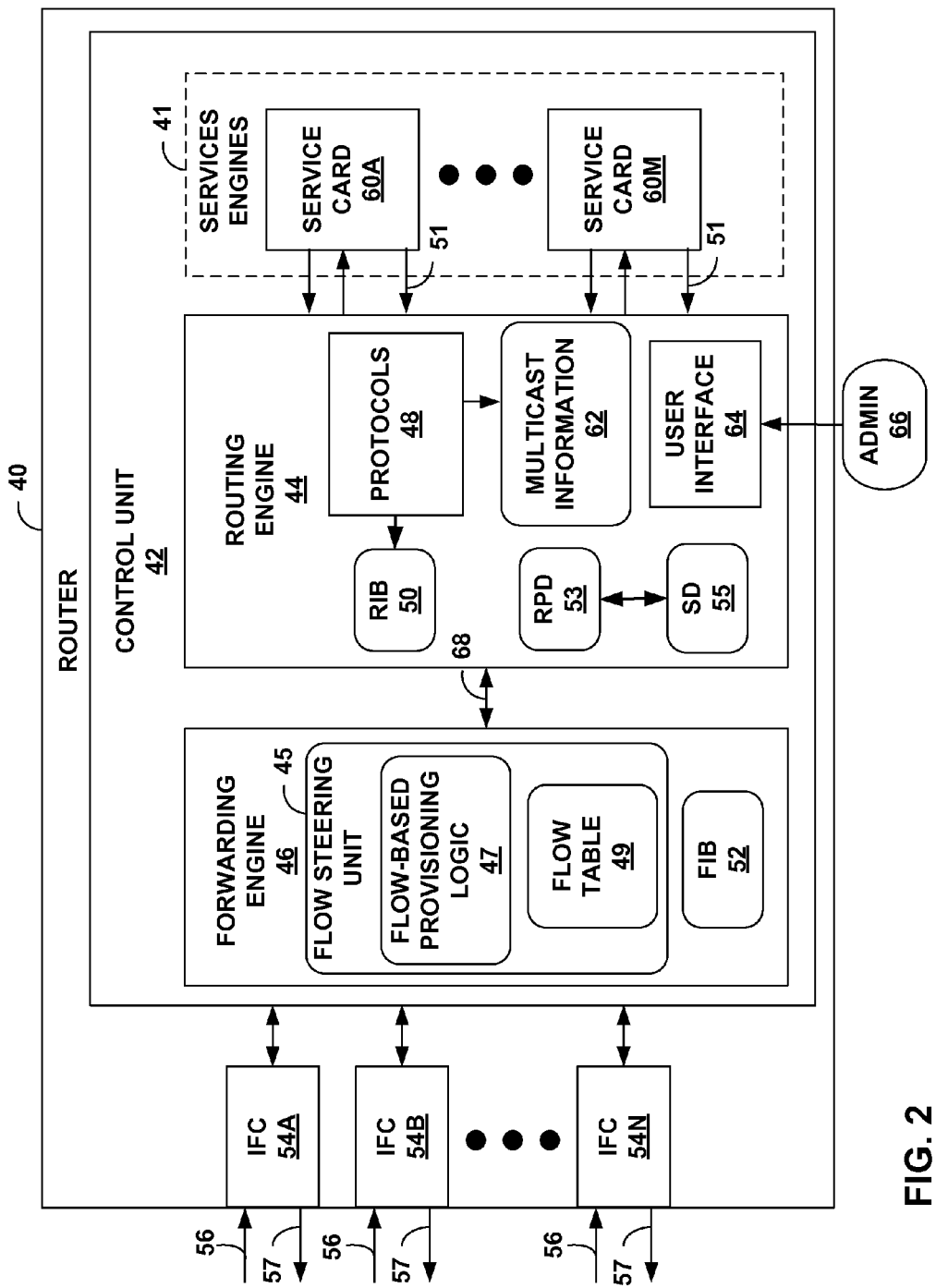
FIG. 2 is a block diagram illustrating example structural components of a router in accordance with the principles of the invention.

FIG. 2 is a block diagram illustrating a router 40 that provides scalable security services for multicast in accordance with the principles of the invention. Router 40 may include one or more services engines 41, which applies services such as firewall services as described in FIG. 1. In this example, routing and services are integrated within a single router 40 that uses a shared forwarding engine 46 suitable for high-speed forwarding functions required by routers that process high-volume multicast traffic, such as router 20 of FIG. 1. For example, the multicast replications performed by router 40 may be on the order of 10,000 replications or more for any given multicast session.

Router 40 comprises a control unit 42 that includes a routing engine 44 coupled to a forwarding engine 46. Routing engine 44 provides an operating environment for routing protocols that perform routing operations. Routing engine 44 is responsible for the maintenance of a routing information base (RIB) 50 to reflect the current topology of a network and other network entities to which it is connected. In particular, routing engine 44 periodically updates RIB 50 to accurately reflect the topology of the network and other entities. In accordance with RIB 50, forwarding engine 46 maintains forwarding information base (FIB) 52 that associates network destinations with specific next hops and corresponding interface ports. For example, control unit 42 analyzes RIB 50 and generates FIB 52 in accordance with RIB 50. Router 40 includes interface cards 54A-54N ("IFCs 54") that receive and send packets via network links 56 and 57, respectively. IFCs 54 may be coupled to network links 56, 57 via a number of interface ports. Forwarding engine 46 may comprise a switch fabric to forward the multicast packets to the interface cards based on the selected next hops.

Generally, forwarding engine 46 may relay certain packets received from IFCs 54 to service cards 60A-60M ("service cards 60"). Specifically, forwarding engine 46 may include a flow steering unit 45 to selectively direct packets to services engines 41 for processing. For example, flow steering unit 45 receives incoming packet flows and determines whether to send the packets through the services engines 41 for processing within one or more of service cards 60, or whether to bypass the services engines 41. An example forwarding plane configuration for separation of services and forwarding in an integrated services router may be found in U.S. patent application Ser. No. 12/235,677, entitled "Forwarding Plane Configuration for Separation of Services and Forwarding in an Integrated Services Router," filed on Sep. 23, 2008, the entire contents of which is incorporated by reference herein.

Service cards 60 receive packets from forwarding engine 46, selectively provide services in accordance with the defined zones and policies, and relay the packet or any response packets to control unit 42 for forwarding by forwarding engine 46 in accordance with FIB 52. A number of input and output logical interfaces may couple service cards 60 to control unit 42.

Service cards 60 having services engines 41 may be installed along a backplane or other interconnect of router 60 to perform a variety of firewall services on the packets received from forwarding engine 46, such as filtering, logging, Intrusion Detection and Prevention (IDP) analysis, virus scanning, deep packet inspection. In some cases, a service card 60 may issue commands 51 to dynamically configure a flow table 49 within flow steering unit 45 of forwarding engine 46. For example, flow steering unit 45 receives a packet and analyzes the received packet to identify a packet flow associated with the packet, e.g., using a flow-based provisioning logic 47 to identify an n-tuple based on information carried in the header or body of the packet (e.g., a five-tuple and an input interface). Upon identifying the packet flow, flow steering unit 45 references an internal flow table 49 to determine whether belongs to a new packet flow or a packet flow already recognized by the router 40.

If flow steering unit 45 does not find a match in the flow table 49, which indicates that the packet belongs to a new packet flow, the flow steering unit 45 directs the packet to service cards 60 of services engines 41 for firewall services. When the packet is directed to services engines 41, one of service cards 60 applies stateful firewall services to the packet. For example, the service cards 60 may extract and assemble application layer data from the packet, and a deep packet inspection (DPI) engine may perform Intrusion Detection and Prevention (IDP) analysis and/or virus scanning to filter out bad packets. As a further example, the service card 60 may perform ciphering, NAT or authentication services.

Upon receiving and processing the packet or packets of a packet flow, service cards 60 may issue a command 51 to install a dynamic filter within the flow table 49, such as an exact match filter that indicates particular actions to be performed when a packet is received that matches the filter. In the case that service cards 60 determine no further firewall services need be applied to a packet flow (e.g., after determining that the packet flow is trusted or benign), service cards 60 may install a filter within flow steering unit 45 to specify that subsequent packets of this packet flow session may be processed on a straight path that bypasses services engines 41. When flow steering unit 45 receives a subsequent packet of the same packet flow, flow steering unit 45 checks the flow table 49, determines that the packet matches the new dynamic filter, and directs the packet on the appropriate path according to the dynamic filter.

Router 40 may receive multicast action requests, such as join or leave request packets from multicast receivers that wish to join or leave a multicast group. The multicast action requests may be exchanged using the Internet Group Management Protocol (IGMP). Router 40 updates multicast information 62 based on the received join or leave requests. Protocols 48 may include IGMP, Protocol Independent Multicast (PIM) protocol, Border Gateway Protocol, and other protocols.

Control unit 42 includes a user interface 64 by which a client such as an administrator 66 ("ADMIN 66") can directly or remotely configure router 40. By interacting with user interface 64, various clients, such as human users and automated scripts, can perform various configuration tasks. For example, the clients may configure interface cards of the router, adjust parameters for the supported network protocols, specify the physical components within the routing device, modify the routing information maintained by the router, access software modules and other resources residing on the router, and the like. For example, user interface 64 may comprise a command line interface (CLI) or other suitable interface (e.g., a web browser-based interface), for processing user or script-driven commands. User interface 64 represents software executing on routing engine 44 that presents a command line interface (e.g., via a shell or Telnet session) for receiving configuration data as described herein, including firewall configuration data defining zones and zone-based policies for application by services engines 41 of service cards 60.

Router 40 supports a command syntax that allows a network administrator to define multicast policies in a manner that reflects multicast replication behavior required for forwarding engine 46 when processing and forwarding the multicast traffic. For example, a management daemon (MD) executing on routing engine 44 may provide user interface 64 that supports the syntax. The syntax includes a command that provides a single container for each multicast policy to be applied to specific zone, and uses an intuitive and user-friendly expressivity with respect to multicasting requirements. The syntax allows the user to categorize the types of services to be applied to the multicast traffic with respect to different zones defined on zone-based firewall services of services engines 41, which leads to scalable service treatment.

In accordance with the techniques of the invention, a control plane of router 40 is responsible for creating "service aware" outgoing interfaces (OIFs), that is, OIFs that replicate and forward the multicast packets in a manner that is consistent with and conducive to efficiently applying firewall services to the multicast packets. To do this, a routing protocol daemon (RPD) 53 and a services daemon (SD) 55 within a control plane of the router cooperate to ensure that the routing protocol daemon creates a set of multicast replication trees for each multicast group. During the cooperation between the RPD 53 and the SD 55, the RPD 53 presents an outgoing interface (OIF) list to the SD 55 based on multicast information maintained by the RPD 53 as the RPD 53 receives multicast join and leave requests. The SD 55 may prune the OIF list based on firewall policies, and also determines a set of post-replication services to be applied to multicast packets for the OIF list. The SD 55 determines the set of post-replication services with reference to a multicast session table that reflect the multicast policies entered by an administrator. Each post-replication service yields a sub-tree to which that service is applied uniformly for all OIFs in that sub-tree. This evaluation by the SD 55 is done at the time that the RPD 53 initiates multicast tree creation, e.g., upon receipt of the first multicast content packet for a multicast group. The SD 55 may also re-evaluate this breakdown at the time of subsequent join or leave messages for the multicast group.

The services plane of router 40 performs pre-replication services upon the multicast packet. For each post-replication service treatment group, the services plane applies each service in that treatment group to a copy of the multicast packet. The services plane identifies a sub-tree for that treatment group, and sends the treated packet to the forwarding plane for replication for that sub-tree.

The techniques of the invention automatically leverage any efficient replication techniques utilized by the data plane (e.g., forwarding engine 46) of router 40. On return from the services plane, the data plane uses existing replication techniques to efficiently replicate each serviced packet to the sub-tree for the serviced packet, according to a multicast FIB.

In one embodiment, each of forwarding engine 46 and routing engine 44 may comprise one or more dedicated processors, storage media, hardware, and the like, and may be communicatively coupled by a data communication channel 68. The data communication channel 68 may be a high-speed network connection, bus, shared-memory or other data communication mechanism.

Router 40 may further include a physical chassis (not shown) for housing control unit 42. The chassis has a number of slots (not shown) for receiving a set of cards, including IFCs 54 and service cards 60. Each card may be inserted into a corresponding slot of the chassis for electrically coupling the card to control unit 42 via a bus, backplane, or other electrical communication mechanism.

Router 40 may operate according to executable instructions fetched from a computer-readable storage medium (not shown). Examples of such media include random access memory (RAM), read-only memory (ROM), non-volatile random access memory (NVRAM), electrically erasable programmable read-only memory (EEPROM), flash memory, and the like. The functions of router 40 may be implemented by executing the instructions of the computer-readable storage medium with one or more processors, discrete hardware circuitry, firmware, software executing on a programmable processor, or a combination of any of the above.

Figure 3:
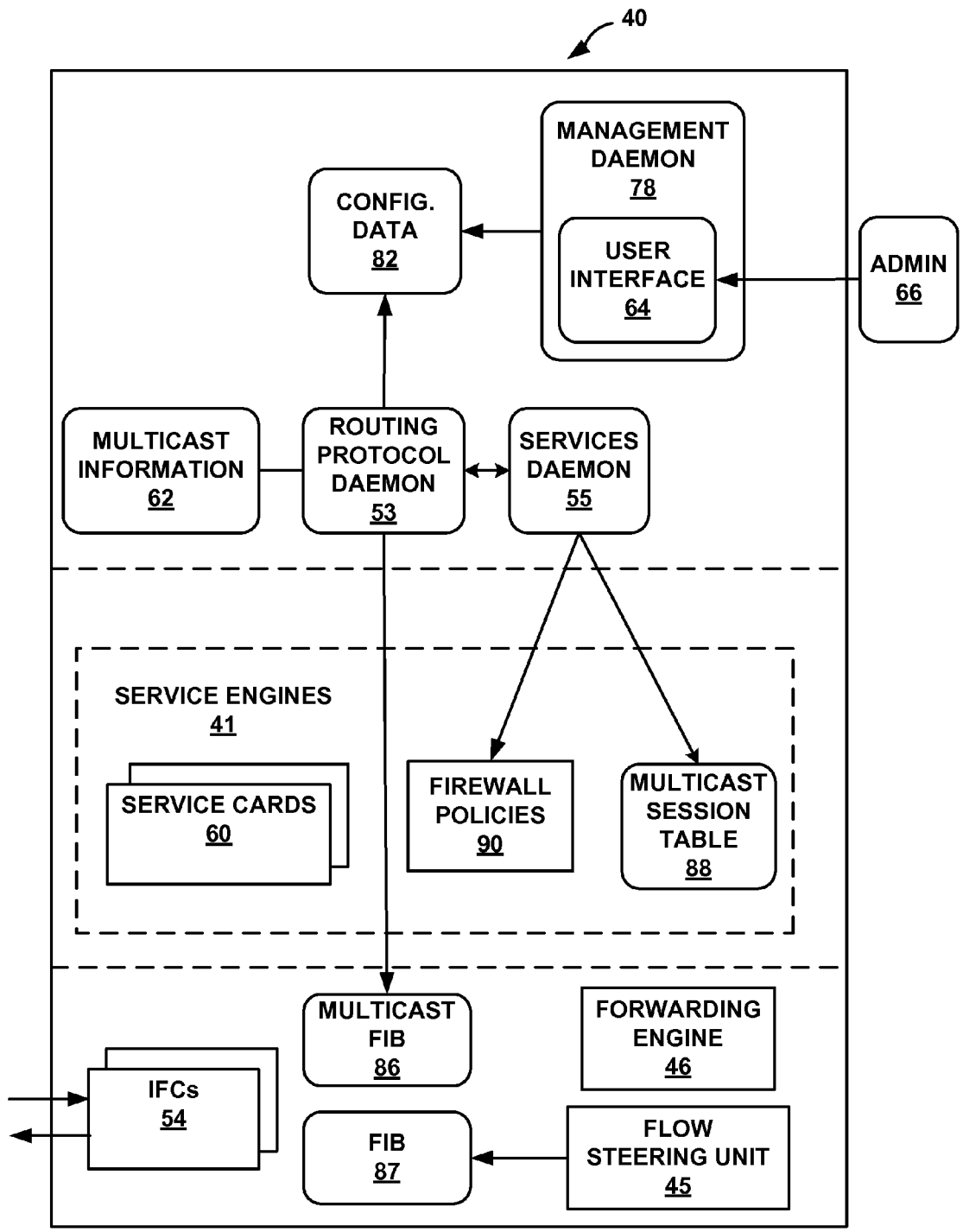
FIG. 3 is a block diagram illustrating a logical abstraction of the operation of the router of FIG. 2.

FIG. 3 is a block diagram illustrating a logical abstraction of the operation of the router 40 of FIG. 2. The operation of router 40 can be viewed as segmented into a control plane 72, service plane 74, and data plane 76. The control plane 72 may be seen as provided by routing engine 44 of FIG. 2. Control plane 72 includes one or more software processes, such as a management daemon 78 and a routing protocol daemon 53 executing on a computing environment provided by one or more microprocessors.

Management daemon 78 presents user interface 64 by which an administrator 66 ("ADMIN") can enter commands to configure router 40 and services engines 41. According to the techniques of the invention, management daemon 78 supports a command syntax that allows administrator 66 to define a multicast policy that specifies security services to be applied to multicast communications received from a zone and to be replicated to a plurality of output zones. Management daemon 78 may store the configuration input received from administrator 66 as configuration data 82 ("CONFIG. DATA 82"), which may take the form of a text file, such as an ASCII file. Alternatively, management daemon 78 may process the configuration input and generate configuration data 82 in any one of a number of forms, such as one or more databases, tables, data structures, or the like. Configuration data 82 may take the form of one or more commands for adding new settings to the current configuration of router 40, commands for deleting or modifying existing settings of the current configuration, or combinations thereof. Router 40 may further parse configuration data 82 and input from administrator 66, and resolve the references to appropriately configure router 40.

Specifically, administrator 66 inputs commands to user interface 64 to configure multicast policies for services engines 41, as described in further detail below. Management daemon 78 stores the multicast policy to configuration data 82. Services daemon 55 programs multicast session table 88 based on the multicast policies stored to configuration data 82. In particular, when a new multicast session is detected, services daemon 55 creates a new entry in multicast session table 88 in accordance with the multicast policy. The multicast session table 88 entry may consist of a single entry (i.e., container) for each multicast session for a given multicast group. The entry specifies the input interface, the multicast group (i.e., by indicating the multicast source and the group identifier), a set of outgoing interfaces (OIFs) of router 40 to which to send copies of multicast packets associated with the source and group, and one or more common services to be applied to the multicast packets prior to replication for each of the OIFs. The single entry also includes one or more exceptions specifying additional services to be applied to copies of the multicast packets post-replication for some subset of the set of OIFs. In some cases, the entry may also specify OIFs for which no services need be applied. The specific OIFs listed in the multicast session entry may be based on the multicast information 62 of control plane 72. That is, based on multicast information 62, services daemon 55 is aware of the OIFs associated with multicast receivers that have asked to join the multicast group.

Administrator 66 may also input commands to user interface 64 to configure other firewall policies 90. Services daemon 55 may program service cards 60 with configuration data received from the administrator defining firewall zones and policies with respect to physical interfaces, causing the service cards 60 of services engines 41 to recognize the defined zones and applying the security policies when processing packets from data plane 76. As described in further detail below, services engines 41 subsequently apply firewall or other services and performs multicast packet replication based on the multicast policies as characterized in multicast session table 88, and based on firewall policies 90.

Router 40 may, for example, provide a text-based command line interface by which a system administrator 66 or software agent provides configuration data in conformance with a command syntax for configuring a multicast policy as follows:

```
multicast-policy from-zone z1 to-oif-zones-list { z2 z3 z4 } {
    match src group proto sport dport {
        actions
    }
    except z2 {
        added actions
        deleted actions
    except z3 {
        added actions
        deleted actions
    except z4 {
        added actions
        deleted actions
```

In the above example, the keyword "multicast-policy" indicates that the administrator is defining a new multicast policy, and the bracket delimiters enclose a collection of policies that define the multicast policy. The keyword "from-zone" indicates that the subsequent text specifies a defined zone for firewall services by services engines 41 from which traffic must be received for the policy to apply. The keyword "to-oif-zones-list" indicates that the subsequent text specifies a defined list of to or more zones to which the multicast traffic must be designated for replication for the multicast policy to apply. As shown above, the multicast policy includes a keyword "match" that allows the administrator to specify packet flow criteria, such as source network address, destination network address, source port, destination port, application protocol or other criteria. Services engines 41 apply the actions enumerated in the multicast policy to multicast network traffic satisfying those conditions. Moreover, as indicated by the "except" keyword, services engines 41 may add or remove actions from that list based on the specific output zone of each replicated multicast packet. Example actions including packet filtering, packet logging, intrusion detection and prevention, virus scanning, network address translation (NAT), policy-based authentication, and the like.

This syntax allows the user to define a multicast policy as a single policy, and has a natural expressivity that automatically defines the system behavior. The syntax allows the user to describe the containment of multicast replication for each source-group pair and application. In contrast to conventional firewall policy syntax, which requires multicast policies to be specified in the form of separate policies for distinct unicast flows, management daemon 78 supports this improved syntax for defining multicast policies in a single policy in reference to the particular zones relevant for the multicast traffic. The syntax provides a single container for each multicast policy, and uses an intuitive and user-friendly expressivity. The syntax allows the user to categorize the types of services to be applied with respect to different zones defined on the zone-based firewall, which leads to scalable service treatment for multicast traffic.

In addition, router 40 may, for example, provide a text-based command line interface by which the system administer or software agent provides configuration data in conformance with a command syntax as follows:

```
zone ZONE_NAME {
    interface INTEFACE_NAME;
    ...
    interface INTEFACE_NAME;
}
```

In the above example, the keyword "zone" indicates that the administrator is defining a new security zone, and the bracket delimiters enclose a collection of interfaces that define that zone. For example, any physical interfaces that fall within that zone can be specified using the keyword "interface." In this way, the administrator may define a plurality of input zones and output zones, and for each zone may specify a collection of one or more physical interfaces that are to be considered by services engines 41 as within that zone. The above syntax is merely illustrative. For example, in other embodiments the keywords "multicast-policy," "interface," or "zone" may be omitted, or other keywords may be used.

In operation, router 40 may receive join or leave request packets from multicast receivers that wish to join or leave a multicast group. Routing protocol daemon (RPD) 53 updates multicast information 62 based on the received join or leave requests. RPD may run various protocols, such as routing protocols and multicast protocols. Generally, RPD 53 cooperates with services daemon 55 in accordance with the techniques described herein to create multicast trees in accordance with defined multicast policies, and installs the multicast trees into multicast FIB 86 of data plane 76. As described in further detail below, the multicast trees are created based on the pre-replication and post-replication services required to be applied. To scale state in the data plane 76, RPD 53 delays creation of multicast trees in multicast FIB 86 until receiving actual multicast content for the multicast group from a multicast source. The multicast trees efficiently specify the manner in which multicast traffic should be replicated and to which output interfaces the replicated traffic should be sent to downstream routers so that all of the members of the multicast group of which router 40 is aware are provided with the multicast content. Delayed creation of entries to multicast FIB 86 help to scale state in data plane 76 by minimizing the amount of state that is stored.

When router 40 receives a multicast packet, router 40 determines whether the packet is the first multicast packet received for the multicast session associated with the particular multicast group identified by the packet. Upon router 40 receiving the first multicast packet for the multicast group from a multicast source, RPD 53 creates an outgoing interface (OIF) list in accordance with multicast information 62. The OIF list created by RPD 53 enumerates the OIFs to which copies of the multicast packet should be sent in order to provide the multicast content to each of the multicast receivers who have joined the multicast group. RPD 53 provides the OIF list to services daemon (SD) 55 for validation. SD 55 analyzes the OIF list provided by RPD 53, and may modify the OIF list.

In some cases, SD 55 may prune the OIF list as needed to remove certain OIFs from the list based on firewall policies 90. SD 55 may also modify the OIF list by segregating the OIF list into sub-lists based on multicast session table 88. As explained above, multicast session table 88 includes entries based on the multicast policies specified by an administrator. SD 55 identifies an entry in multicast session table 88 that pertains to the multicast group for which RPD 53 has generated the OIF list. SD 55 creates one or more OIF-sub-lists based on the exceptions specified in the matching entry of multicast session table 88. In other words, SD 55 creates the OIF-sub-lists that each includes those OIFs for which one or more common services can be applied after replication of the multicast traffic has occurred for each of the OIFs. SD 55 provides the modified OIF list to RPD 53, which then pushes a multicast FIB 86 down to data plane 76. Thus, the techniques described herein change the manner in which control plane 72 pushes state down into data plane 76. Where previously a conventional router would have created only a single multicast tree for installation into data plane 76, the techniques of the invention require that SD 55 and RPD 53 cooperate to result in the installation of multiple multicast trees in the data plane 76 for a given multicast group.

By way of illustration, RPD 53 may provide SD 55 with an OIF list of the form (S, G, OIF list), where S is the multicast source, G is the multicast group identifier, and OIF list enumerates the OIFs associated with the multicast group. SD 55 may modify the OIF list and return to RPD 53 a modified OIF list (or collection of OIF-sub-lists) of the form (S, G, <OIF-sub-list1, service A, service B>, <OIF-sub-list2, service C>, . . . , <OIF-sub-listN, service X, service Y, service Z>). The modified OIF list provides the sub-lists of OIFs and corresponding services to be commonly applied to those OIFs on the sub-lists. In some cases, the modified OIF list may include a special forwarding OIF-sub-list that specifies a subset of the OIFs for which no services are to be applied. If this is the case, the modified OIF list may look like this: (S, G, <f-OIF-sub-list, <OIF-sub-list1, service A, service B>, <OIF-sub-list2, service C>, . . . , <OIF-sub-listN, service X, service Y, service Z>), where "f-OIF-sub-list" is the forwarding OIF-sub-list.

The special forwarding OIF-sub-list may be used when the default multicast policy is "permit-all" and some OIFs are in a zone for which no policy is needed. "Permit-all" means that the default action is that traffic will simply be permitted. This is opposed to a default multicast policy of "drop-all," in which the default action is that traffic will be dropped.

RPD 53 creates one or more multicast replication trees based on the modified OIF list provided by SD 55. The multicast replication trees specify the manner in which multicast traffic should be replicated and to where the replicated traffic should be sent so that all of the members of the multicast group of which router 40 is aware are provided with the multicast content. For example, RPD 53 may create a different multicast tree to correspond to each OIF-sub-list in the modified OIF list. RPD 53 installs the multicast trees to multicast FIB 86 of data plane 76. Forwarding engine 46 subsequently refers to multicast FIB 86 in determining how to forward packets to the appropriate destinations.

For example, when a packet is received by one of IFCs 54 in data plane 76, flow steering unit 45 determines that the packet is a multicast packet (e.g., based on packet header information) analyzes the received packet to identify a packet flow associated with the packet, e.g., using a flow-based provisioning logic to identify an n-tuple based on information carried in the header or body of the packet. Upon identifying the packet flow, flow steering unit 45 references an internal flow table to determine whether belongs to a new packet flow or a packet flow already recognized by the router 40.

When an entry is found in the flow table, flow steering unit 45 refers to FIB 87 which indicates whether the multicast packet requires either (1) a single replication to the service plane 74, or (2) one replication to be sent to the service plane 74 for treatment, and other replication(s) to be sent directly to certain OIFs for forwarding (i.e., in the case of a special forwarding OIF-sub-list, as described above). Forwarding engine 46 sends a copy to the service plane 74 and copies to the OIFs as indicated by FIB 87. At service plane 74, services engines 41 apply services to the multicast packet as specified by multicast session table 88 and firewall policies 90. For example, one or more of service cards 60 may process the packets. Example services that may be applied include firewall, flow blocking, network address translation (NAT), antivirus (AV) scanning and detection, intrusion detection protection (IDP), deep packet inspection (DIP) and/or any other security services.

Specifically, service plane 74 applies common services to the multicast packet as required by the multicast policy expressed in the pertinent entry of multicast session table 88 for the multicast group associated with the multicast packet. After applying the common services, if there are any exceptions specified in the entry of multicast session table 88, service plane 74 replicates the packet so that there are enough copies of the packet for each specified exception, and applies services to each respective copy as required. Once all of the services have been applied, service plane transfers the serviced packets to data plane 76 for distribution to the appropriate data plane OIFs. Once at the data plane OIFs of IFCs 54, the IFCs 54 may further replicate the multicast packet as needed for sending a replicated multicast packet out each of the OIFs designated for the multicast group, thereby ensuring that a copy of the multicast packet is sent to each of the multicast receivers.

In some embodiments, when a packet is forwarded from forwarding engine 46 to service engines 41, the services that are required to be applied to the packet can be expressed as a cookie. That is, a cookie can be communicated along with the packet that indicates what kind of services or treatments need to be provided by the service engines 41. In another embodiment, service engines 41 may maintain state that maps the incoming interface and packet flow to the required services. By referencing this state, the service engines 41 can identify which services are required.

Multicast group membership is typically quite dynamic, with members of a multicast group joining and leaving at will. In the event that a multicast receiver joins or leaves a multicast group for which RPD 53 has already installed multicast trees in multicast FIB 86, in some embodiments the replications expressed in the multicast trees may be reevaluated by control plane 72. For example, RPD 53 may determine that a newly received join or leave request is for a multicast group for which multicast trees have already been installed. RPD 53 may call upon SD 55 to update the OIF list in view of the new join or leave request, as needed. SD 55 may add a new OIF to one of the OIF-sub-lists if the new join request corresponds to an OIF that is not already present in any of the OIF-sub-lists. In the case of a newly received leave request, SD 55 may remove an OIF from one of the OIF-sub-lists if there are no longer any receivers in the multicast group associated with the OIF. SD 55 may provide RPD 53 with an updated OIF list based on these changes, and RPD 53 may update multicast FIB 86 with updated multicast trees created based on the updated OIF list. The changes to multicast group membership may also trigger changes to entries of multicast session table 88. Unicast route changes do not affect the multicast operation of router 40, and so RPD 53 and SD 55 do not need to make any changes to multicast FIB 86 when router 40 is notified of unicast route changes.

When administrator 66 makes changes to multicast policies or to firewall policies 90 during operation of router 40, SD 55 may respond to these changes in a manner consistent with conventional firewall operation. For example, SD 55 may leave existing sessions as they are, and only modify new multicast sessions in view of the changed policies. If necessary, SD 55 may also evaluate existing multicast sessions and make changes on a larger time scale.

FIG. 4 is a block diagram illustrating an example multicast session table 88 maintained by router 40 of FIGS. 2 and 3 in further detail. As shown in FIG. 4, multicast session table 88 may include entries, such as entry 90, that include fields specifying an input interface, a source, group identifier (ID), OIF identifiers (OIF_IDs) and common security services to be applied to packets for those OIFs, and OIF_IDs and associated security services to be added or deleted. The field that specifies the OIF_IDs and common services may be an extensible field that defines common services to be applied. The field(s) that specify the OIF_IDs and exception services to be added or deleted may also be an extensible field. For example, the security services to be applied may be specified by way of a bit mask. In this example, each type of security service provided by the integrated firewall may be associated with a different bit, which is set where appropriate.

Although not shown, multicast session table 88 may include many entries. Each entry may include a plurality of exception fields. In some cases, the entries may also specify OIFs for which no services need be applied. Service daemon 55 may maintain multicast session table 88 as separate from a unicast session table (not shown) or may maintain a single session table that combines multicast sessions and unicast sessions. In the case of a single combined session table, services daemon 55 may identify entries for multicast sessions as such in the combined session table.

Figure 5:
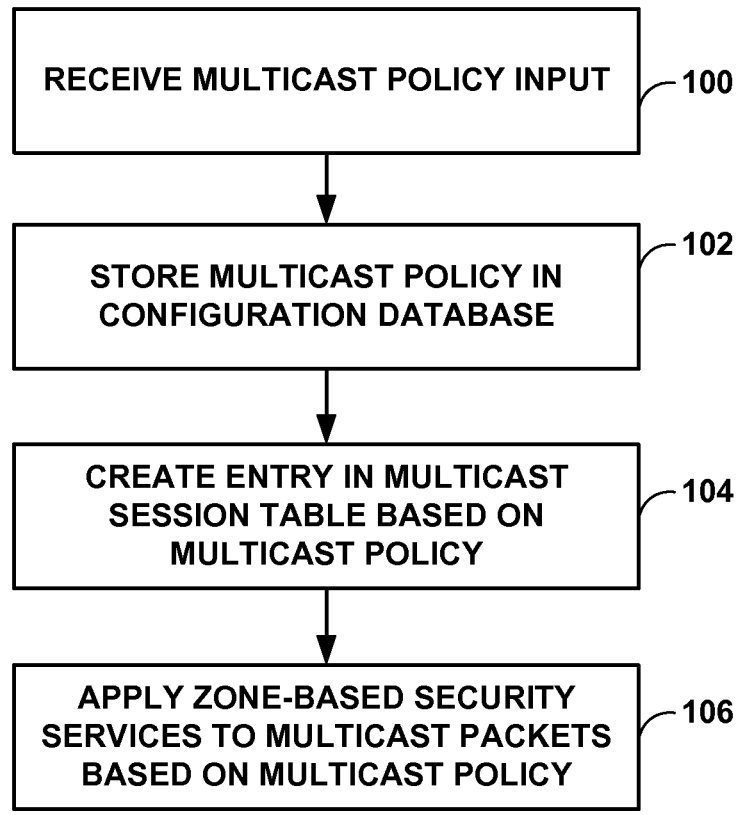
FIG. 5 is a flowchart illustrating example operation of the router of FIG. 1 in accordance with the principles of the invention.

FIG. 5 is a flowchart illustrating example operation of a router with an integrated firewall, such as routers 20 and 40 of FIGS. 1-3. In operation, router 40 receives multicast policy input, such as commands to user interface 64 from administrator 66 to configure router 40 (100). As described above, management daemon 78 supports a command syntax that allows administrator 66 to define a multicast policy that specifies services to be applied to multicast communications received from a zone and destined to a plurality of output zones. Management daemon 78 stores the multicast policy to configuration data 82 (102). Services daemon 55 programs multicast session table 88 based on the multicast policies stored to configuration data 82. In particular, when a new multicast session is detected, services daemon 55 creates a new entry in multicast session table 88 in accordance with the multicast policy (104). For example, the entry in multicast session table 88 may specify security services to be applied to multicast packets of the multicast session based on the zone(s) to which the OIFs for the multicast session map. Services engines 41 of router 40 apply zone-based security services to received multicast packets based on the defined multicast policy (106).

Figure 6A:
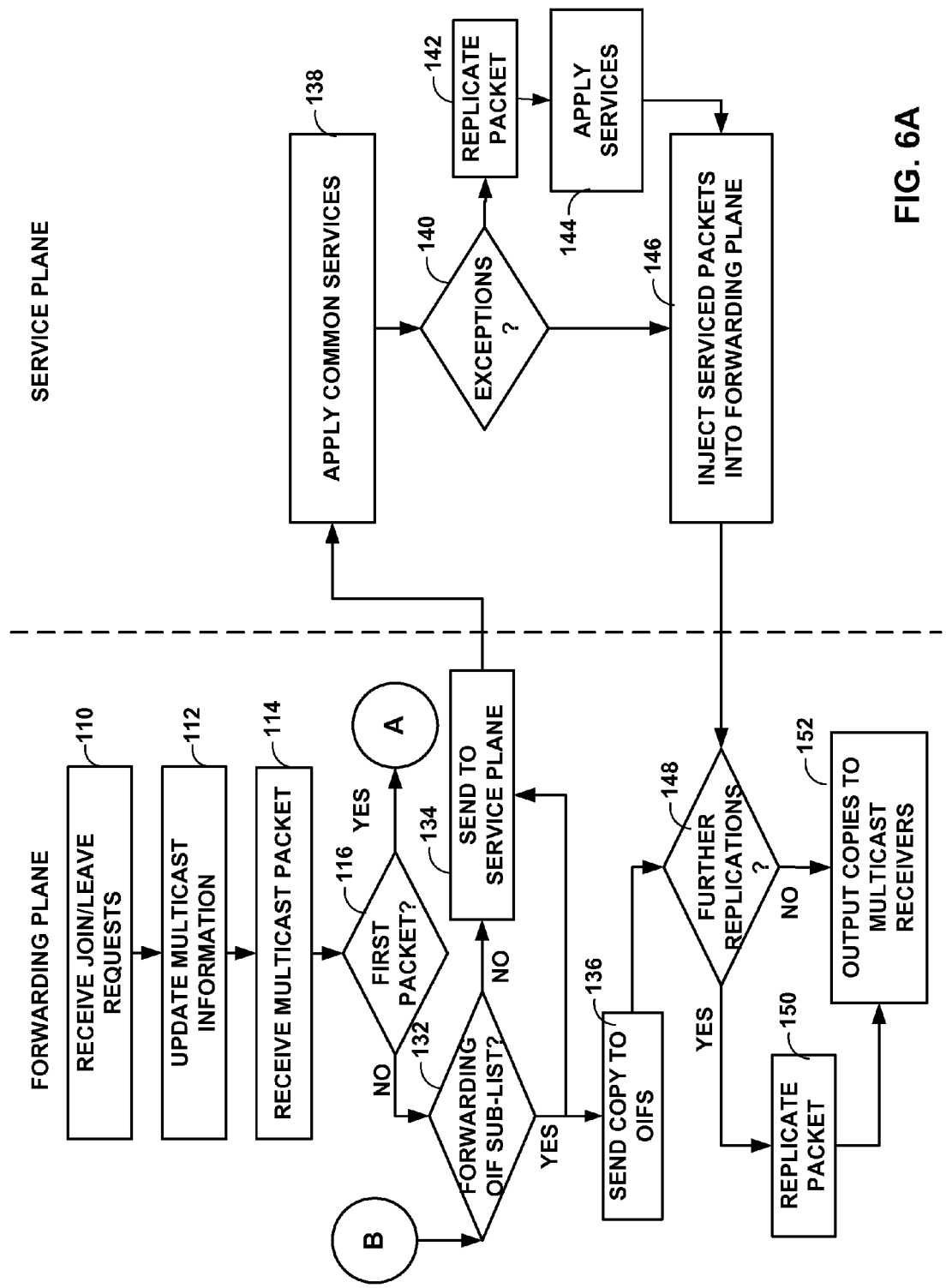
FIGS. 6A-6B are flowcharts illustrating example operation of the router of FIG. 1 in accordance with the principles of the invention.
Figure 6B:
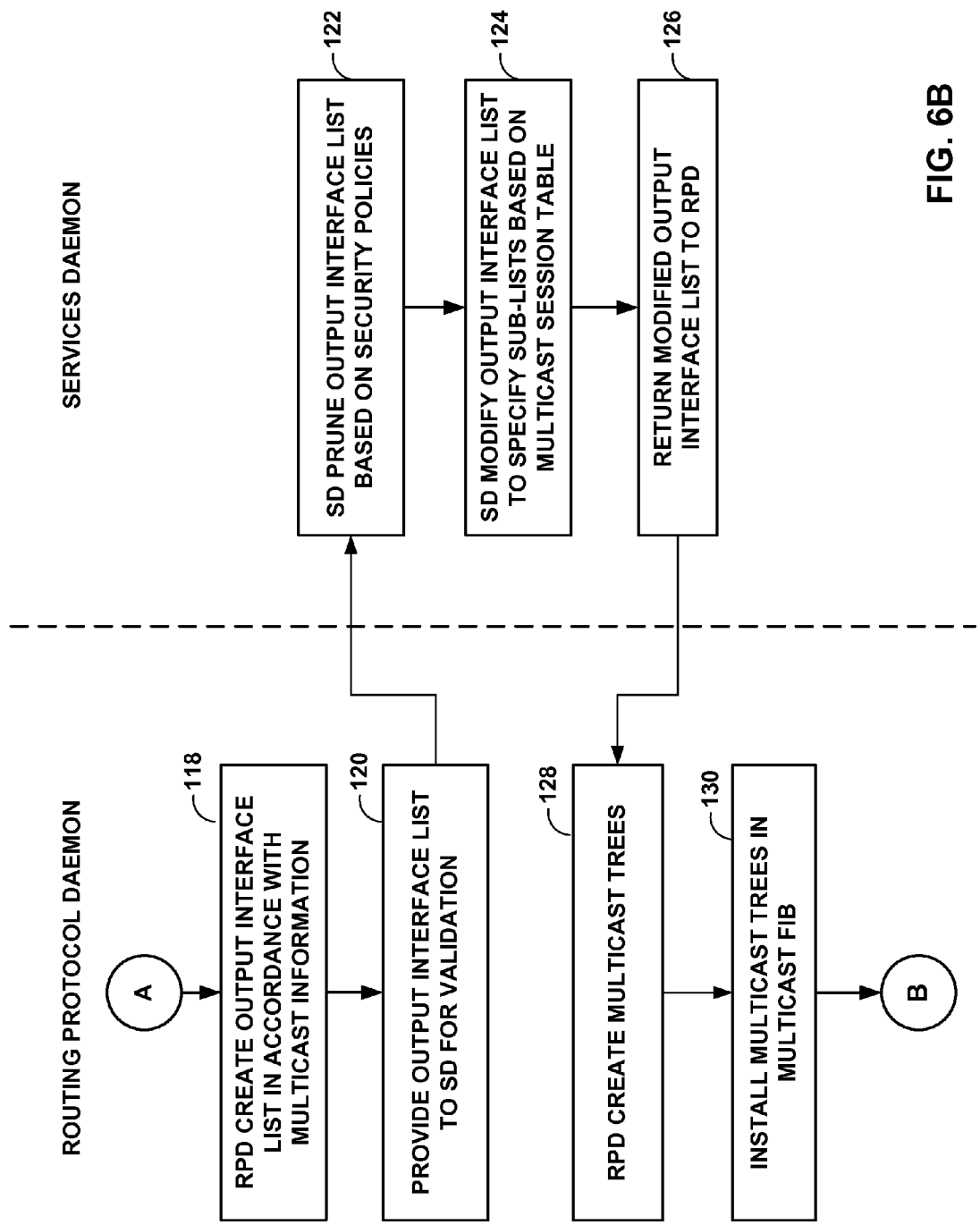

FIGS. 6A-6B are flowcharts illustrating example operation of a router with an integrated firewall, such as routers 20 and 40 of FIGS. 1-3. For purposes of example, FIGS. 6A-6B will be described in terms of router 40 of FIGS. 2 and 3. In operation, router 40 may receive join or leave request packets from multicast receivers that wish to join or leave a multicast group (110). RPD 53 updates multicast information 62 based on the received join or leave requests (112). When router 40 receives a multicast packet (114), flow steering unit 45 of the forwarding plane 64 analyzes the received packet to identify a packet flow associated with the packet, e.g., using a flow-based provisioning logic to identify a five-tuple based on information carried in the header or body of the packet. Upon identifying the packet flow, flow steering unit 45 references an internal flow table to determine whether the packet is the first packet of a new multicast session or belongs to a multicast session already recognized by the router (116).

If flow steering unit 45 does not find a match in the flow table, which indicates that the multicast packet belongs to a new multicast session (YES branch of 116) (moving from block "A" of FIG. 6A to block "A" of FIG. 6B) the flow steering unit 45 directs the packet to RPD 53 of the control plane. RPD 53 creates an outgoing interface (OIF) list in accordance with multicast information 62 (118). The OIF list created by RPD 53 enumerates the OIFs on which copies of the multicast packet should be sent in order to provide the multicast content to each of the multicast receivers who have joined the multicast group. RPD 53 provides the OIF list to services daemon (SD) 55 for validation (120). SD 55 analyzes the OIF list provided by RPD 53, and may modify the OIF list.

In some cases, SD 55 may prune the OIF list as needed to remove certain OIFs from the list based on firewall policies 90 (122). SD 55 may also modify the OIF list by segregating the OIF list into sub-lists based on multicast session table 88 (124). As explained above, multicast session table 88 includes entries based on the multicast policies specified by an administrator. SD 55 identifies an entry in multicast session table 88 that pertains to the multicast group for which RPD 53 has generated the OIF list. SD 55 creates one or more OIF-sub-lists based on the exceptions specified in the matching entry of multicast session table 88. In other words, SD 55 creates the OIF-sub-lists that each includes those OIFs for which one or more common services can be applied after replication of the multicast traffic has occurred for each of the OIFs. SD 55 provides the modified OIF list to RPD 53 (126). Thus, the techniques described herein change the manner in which control plane 72 pushes state down into data plane 76. Where previously a conventional router would have created only a single multicast tree for installation into data plane 76, the techniques of the invention require that RPD 53 and SD 55 cooperate to result in the installation of multiple multicast trees in the data plane 76 for a given multicast group.

RPD 53 creates one or more multicast replication trees based on the modified OIF list provided by SD 55 (128). The multicast replication trees specify the manner in which multicast traffic should be replicated and to where the replicated traffic should be sent so that all of the members of the multicast group of which router 40 is aware are provided with the multicast content. For example, RPD 53 may create a different multicast tree to correspond to each OIF-sub-list in the modified OIF list. RPD 53 installs the multicast trees to multicast FIB 86 of data plane 76 (130) (Operation moves from block "B" of FIG. 6B to block "B" of FIG. 6A). Forwarding engine 46 subsequently refers to multicast FIB 86 in determining how to forward packets to the appropriate destinations.

Alternatively, when an entry is found in the flow table (NO branch of 116), flow steering unit 45 may see the multicast packet as requiring either (1) sending the multicast packet to the service plane 74 (NO branch of 132), or (2) sending a replication to the service plane 74 for treatment and other replication(s) to be sent directly to OIFs for forwarding (i.e., in the case of a special forwarding OIF-sub-list, as described above) (YES branch of 132). Forwarding engine 46 sends the multicast packet to the service plane 74 (134) and copies to the OIFs as indicated (136). At service plane 74, services engines 41 apply services to the multicast packet as specified by multicast session table 88 and firewall policies 90. For example, one or more of service cards 60 may process the packets. Example services that may be applied include firewall, flow blocking, network address translation (NAT), anti-virus (AV) scanning and detection, intrusion detection protection (IDP), deep packet inspection (DIP), ciphering, authentication services, and/or any other security services.

Specifically, prior to replication at the service plane 74, service plane 74 applies common services to the multicast packet as required by the multicast policy expressed in the pertinent entry of multicast session table 88 for the multicast group associated with the multicast packet (138). After applying the common services, if there are any exceptions specified in the entry of multicast session table 88 (140), service plane 74 replicates the packet so that there are enough copies of the packet for each specified exception (142), and applies services to each respective copy as required (144).

To determine what multicast policy may apply to the multicast packet, firewall 21 must determine the input zone associated with the multicast packet. Firewall 21 learns the input zone from the forwarding plane based on the source and group of the multicast packet (e.g., as identified within the packet header). Upon receiving a packet from packet from forwarding engine 46, firewall 21 processes the packet to identify the input interface by which the packet was initially received by router 40. In one example, either the IFC 54 upon which the packet was received or the forwarding engine 46 determines the specific input interface upon which the packet was received by router 40 and attaches information to the packet identifying the particular interface prior to relaying the packet to services engines 41 for processing. When router 40 receives the first packet of a new multicast session (i.e., packet flow), router 40 sends the packet up to control plane 72. Generally, RPD 53 will look at the multicast packet and determine replication is required, and push down a multicast FIB entry. Unlike conventional multicast, before pushing down a multicast FIB entry, RPD 53 SD 55 and push down many OIF lists. In another embodiment, RDP 53 provides the overall OIF list to SD 55, which breaks this down and pushes down many OIF lists. Once the OIF list state is pushed down to data plane 76, the multicast packet that originally triggered these actions is processed normally and sent out by router 40.

In some embodiments, one or more of service cards 60 of services engines 41 may be programmed by routing engine 44 and installed with a copy of all or a portion of FIB 52 as used by forwarding engine 46. Alternatively, FIB 52 of forwarding engine 46 may be stored in a shared memory accessible via service cards 60. In either case, services engines 41 traverse the FIB based on information within the packet so as to determine the next hop and corresponding output interface for the packet.

Next, having determined the input zone and the output zone for the packet, services engines 41 access its configuration data to identify any multicast policy that has been defined for traffic traveling between the zones. At this time, services engines 41 also apply any packet flow criteria that have been defined by the policies. Upon identifying the matching policies, services engines 41 apply to the packet the actions specified by those policies, as described above.

Once all of the services have been applied, service plane 74 injects the serviced multicast packet(s) back into data plane 76 for forwarding by forwarding component 53 in accordance with multicast FIB 86 (146). At this time, service cards 60 of services engines 41 may signal flow steering unit 45 and direct the flow steering unit 45 to install criteria in its internal flow table 49 designating whether subsequent packets of the packet flow should be trusted such that firewall services need not be applied, or whether the subsequent packets should continue to be directed to services engines 41.

Once at the data plane OIFs of IFCs 54, the IFCs 54 may replicate the multicast packet as needed for sending the packet out to the multicast receivers (148, 150), and the OIFs output the copies to the multicast receivers (152).

In some cases, when flow steering unit 75 finds a match in the flow table 49 for the received multicast packet and the matching entry directs the packet to bypass services engines 41, flow control module 40 does not forward the packet to firewall 64 but signals forwarding component 53 that the packet can immediately be replicated and forwarded in accordance with multicast FIB 52. In the above-described example, router 40 integrates multicast-capable, zone-based firewall security features in single network device to provide scalable security to high-volume multicast traffic.

Although described with respect to provider edge routers, the techniques described herein may be applied to other types of routers and network devices generally. For example, the router may be an edge device, peering device, or core device of a Service Provider (SP) network. As additional examples, the router may be an edge router that provides broadband access, such as a Broadband Remote Access Server (BRAS) or a Broadband Network Gateway (BNG) or a Cable Modem Termination System (CMTS). As another example, the router may be an edge router that provides enterprise connectivity to public networks, such a Multi-Service Edge router (MSE). As another example, the router may be an edge router that provides mobile access, such as a Gateway GPRS (General Packet Radio Services) Support Node (GGSN), a Packet Data Serving Node (PDSN), or a Public Data Network Gateway (PDN-GW) As a further example, the router may be a data center device (e.g., and edge router) that provides routing and security functions for packets flowing in or out of a data center. As another example, the router may be a peering router that serves as a point of interconnection between network service providers. As yet another example, the router may be an aggregation router or core router within an IP network core of a service provider, such as a core router positioned between GGSNs or PDSNs or BNGs. In addition, the router may be a device associated with a private enterprise network.

Various embodiments of the invention have been described. These and other embodiments are within the scope of the following claims.

The invention claimed is:

1. A network device comprising:
   one or more hardware-based processors;
   a plurality of interfaces configured to send and receive multicast packets;
   a firewall integrated within the network device, wherein the network device is configured with one or more zones to be recognized by the firewall when applying stateful firewall services to the multicast packets;
   a user interface that supports a syntax that allows a user to define a single multicast policy to be applied to multicast sessions associated with a multicast group, wherein the multicast policy specifies one or more stateful firewall services to be applied by the firewall to the multicast packets destined for one or more specified zones of the one or more zones; and
   a services component executing on the one or more hardware-based processors of the network device, wherein the services component is configured to determine, based on the single multicast policy and interfaces associated with the specified zones, one or more of the stateful firewall services to be applied by the firewall prior to replication of the multicast packets and one or more of the stateful firewall services to be applied by the firewall after replication of the multicast packets,
   wherein the firewall is configured to apply the stateful firewall services to the multicast packets as determined by the services component.

2. The network device of claim 1, wherein the syntax allows the user to define the single multicast policy with a single command.

3. The network device of claim 1, wherein the firewall maintains a multicast session table that includes an entry that specifies the: (a) one or more common stateful firewall services to be applied to copies of the multicast packets destined for two or more outgoing interfaces of the network device, and (b) one or more exceptions specifying one or more outgoing interfaces and additional services of the stateful firewall services to be applied to copies of the multicast packets for the one or more outgoing interfaces.

4. The network device of claim 3, wherein upon receiving a multicast action request from one of the multicast receivers indicating a change in membership status relative to a multicast group, the firewall is configured to update the multicast session table to reflect the change in membership status.

5. The network device of claim 1, wherein the user interface is a text-based interface that supports a command syntax that allows the user to specify the zones.

6. The network device of claim 1, further comprising:
   a routing component that executes a routing protocol to maintain routing information specifying routes through a network, wherein the control unit executes at least one multicast protocol to establish a multicast group for communicating the multicast packets from a multicast source to a plurality of multicast receivers; and
   a forwarding component configured by the routing component to select next hops for the multicast packets in accordance with the routing information, the forwarding component comprising a switch fabric to forward the multicast packets to the interfaces based on the selected next hops, wherein the forwarding component includes a flow control module that, upon receiving multicast packets from the network, directs one or more of the multicast packets to the firewall for application of the stateful firewall services.

7. The network device of claim 6, wherein the routing component is configured to create multicast replication trees that specify a manner in which multicast packets are to be replicated for transmission to the multicast receivers, and installs the multicast replication trees to a multicast forwarding information base (FIB) associated with the forwarding component.

8. The network device of claim 7,
   wherein, prior to creating the multicast replication tree, the routing component is configured to provide an outgoing interface (OIF) list to the services component, wherein the services component modifies the OIF list based on the defined multicast policy, and provides the modified OIF to the routing component as a plurality of separate OIF sub-lists that represent those OIFs for which the one or more common stateful firewall services are to be applied and those OIFs corresponding to exceptions specifying the one or more additional stateful firewall services to be applied, and wherein the routing component creates and installs to the multicast FIB a multicast replication tree for each of the OIF sub-lists.

9. The network device of claim 6, wherein when the firewall is configured with a default policy that permits forwarding of those packets for which no matching policy exists, the routing component creates a forwarding OIF list that separately specifies those OIFs for which firewall need provide no stateful firewall services.

10. The network device of claim 6,
    wherein, based on the routing information, the routing component programs the forwarding component with forwarding information that associates network destinations with specific next hops and corresponding interface ports of interface cards of the router and a specific next hop that points to the firewall,
    wherein the routing component programs the firewall with at least a portion of the forwarding information, and
    wherein the routing component programs the forwarding component with multiple specific next hops and corresponding interface ports of interface cards of the router, wherein each of the multiple specific next hops corresponds to one of a plurality of stateful firewall services applied by the firewall.

11. The network device of claim 1,
    wherein the firewall determines an input zone and one or more output zones for each of the multicast packets based on the configured one or more zones, and
    wherein the firewall applies one or more of the stateful firewall services to each of the multicast packets based on the input zone determined for the multicast packet in accordance with the defined multicast policy.

12. The network device of claim 1, wherein the stateful firewall services include virus scanning of application-layer data carried by the multicast packets.

13. The network device of claim 1, wherein the network device comprises one of a provider edge router, a Broadband Remote Access Server (BRAS), a Broadband Network Gateway (BNG), Cable Modem Termination System (CMTS), a Multi-Service Edge router (MSE), a Gateway GPRS (General Packet Radio Services) Support Node (GGSN), a Packet Data Serving Node (PDSN), or a Public Data Network Gateway (PDN-GW), a data center device that provides routing and security functions for packets flowing in or out of a data center, a peering router that serves as a point of interconnection between network service providers.

14. A method comprising:
    executing, with a network device, at least one multicast protocol to establish a multicast group for communicating multicast packets from a multicast source to a plurality of multicast receivers;

presenting, with the network device, a user interface that supports a syntax that allows a user to define a single multicast policy to be applied to multicast sessions associated with a multicast group, wherein the multicast policy specifies one or more stateful firewall services to be applied by the firewall to the multicast packets destined for one or more specified zones of the one or more zones, determining, by a services component executing on the firewall and based on the single multicast policy and interfaces associated with the specified zones, one or more of the stateful firewall services to be applied by the firewall prior to replication of the multicast packets and one or more of the stateful firewall services to be applied by the firewall after replication of the multicast packets; and applying the one or more common stateful firewall services and the one or more additional stateful firewall services to received multicast packets with the firewall of the network device as determined by the services component.

15. The method of claim 14, further comprising:
receiving, from a network, the multicast packets at a plurality of interfaces of the network device;
directing, with a flow control module of a forwarding component of the network device, one or more of the received multicast packets to the firewall for application of stateful firewall services;
after applying the stateful firewall services, forwarding at least some of the multicast packets from the firewall to the forwarding component;
selecting next hops for the multicast packets within the network with the forwarding component; and
forwarding the multicast packets to the interfaces in accordance with the selected next hops.

16. The method of claim 14, wherein the user interface supports a syntax that allows the user to define the one or more zones, and define subsets of the plurality of interfaces associated with the zones, wherein the plurality of interfaces is configured to send and receive multicast packets.

17. The method of claim 14, further comprising:
for a received multicast packet, determining an input zone for the received multicast packet based on an input interface on which the multicast packet is received; and
applying one or more of the stateful firewall services to the multicast packet based on the input zone determined for the multicast packet.

18. The method of claim 14, further comprising:
receiving a first multicast packet of a multicast session associated with a multicast group;
upon receiving the first multicast packet, creating, with a routing component of the network device, a multicast replication tree for the multicast group; and
installing the multicast replication tree to a multicast forwarding information base (FIB) associated with a forwarding component of the network device.

19. The method of claim 18, further comprising:
prior to creating the multicast replication tree, the routing component providing an outgoing interface (OIF) list to the services component;
modifying, by the services component, the OIF list based on the defined multicast policy;
providing the modified OIF to the routing component as a plurality of separate OIF sub-lists that represent those OIFs for which the one or more common stateful firewall services are to be applied and those OIFs corresponding to the exceptions specifying the one or more additional stateful firewall services to be applied;
creating, with the routing component, a multicast replication tree for each of the OIF sub-lists; and
installing the multicast replication trees to the multicast FIB.

20. A non-transitory computer-readable storage medium comprising program instructions to cause a processor of a network device to:
execute at least one multicast protocol to establish a multicast group for communicating multicast packets from a multicast source to a plurality of multicast receivers;
present a user interface that supports a syntax that allows a user to define a single multicast policy to be applied to multicast sessions associated with a multicast group, wherein the multicast policy specifies one or more stateful firewall services to be applied by the firewall to the multicast packets destined for one or more specified zones of the one or more zones;
determine, based on the single multicast policy and interfaces associated with the specified zones, one or more of the stateful firewall services to be applied by the firewall prior to replication of the multicast packets and one or more of the stateful firewall services to be applied by the firewall after replication of the multicast packets; and
apply the one or more common stateful firewall services and the one or more additional stateful firewall services to received multicast packets with the firewall of the network device as determined.

* * * * *